March 11, 1924.  1,486,184
F. S. FROST
PULSATOR
Filed Dec. 3, 1920    2 Sheets-Sheet 2
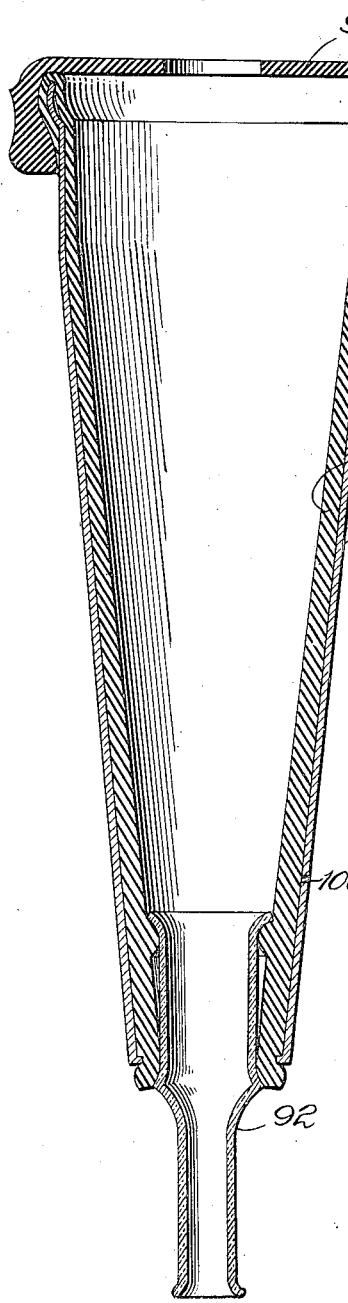
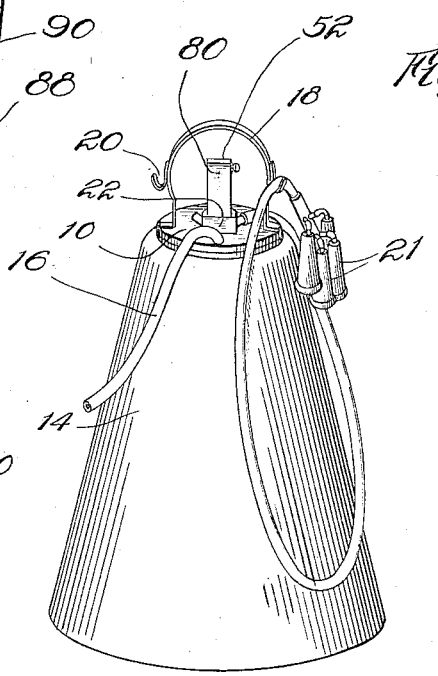
Inventor
Frank S. Frost
By Miller Chindahl Parker
Att'ys Patented Mar. 11, 1924.

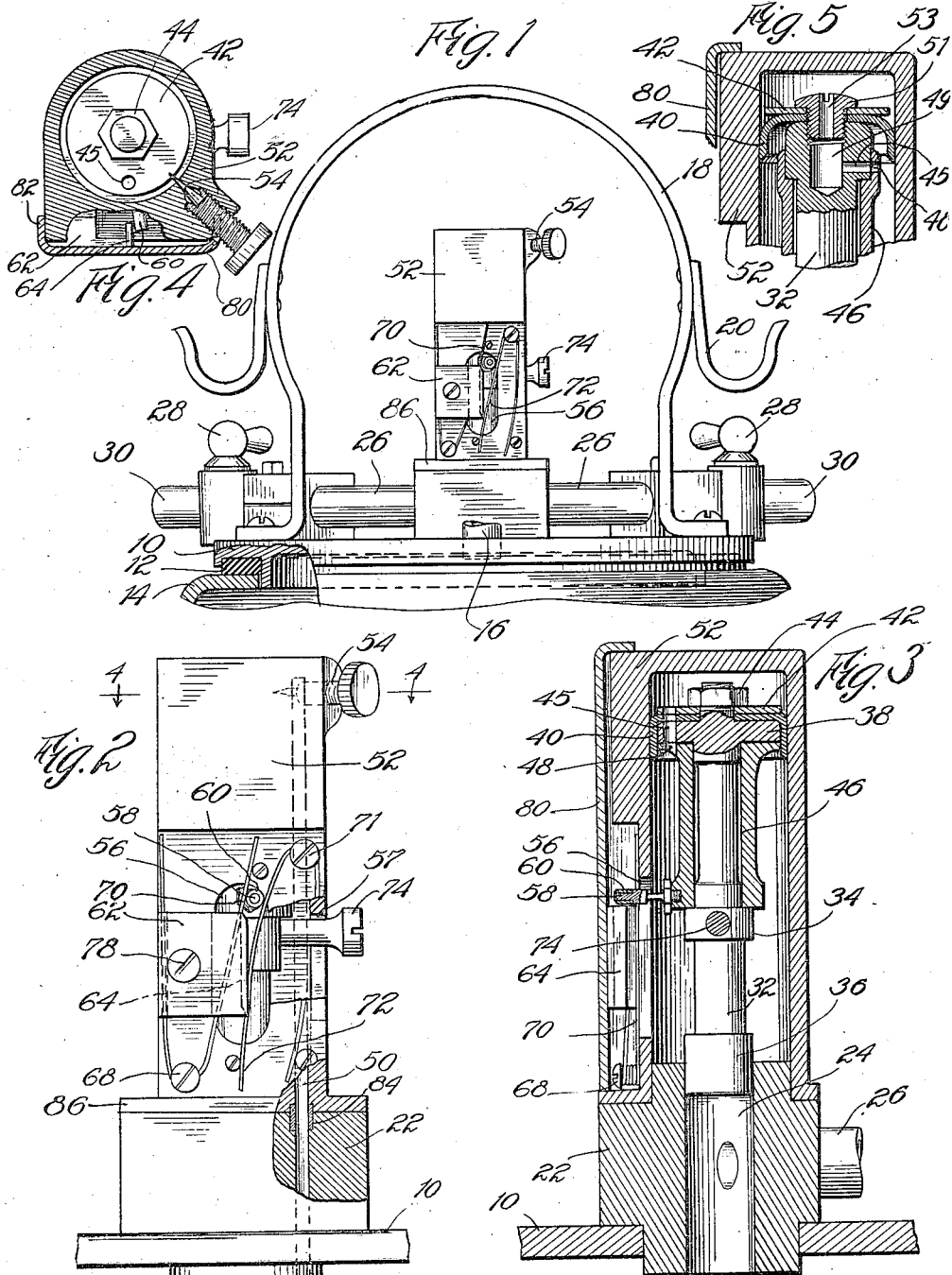

1,486,184

UNITED STATES PATENT OFFICE.

FRANK S. FROST, OF CHICAGO, ILLINOIS, ASSIGNOR TO SEARS, ROEBUCK AND CO., OF CHICAGO, ILLINOIS, A CORPORATION OF NEW YORK.

PULSATOR.

Application filed December 3, 1920. Serial No. 428,107.

*To all whom it may concern:*

Be it known that I, FRANK S. FROST, a citizen of the United States, residing at Chicago, in the county of Cook and State of Illinois, have invented certain new and useful Improvements in Pulsators, of which the following is a specification.

My invention relates to the art of milking and more specifically to an improved apparatus for practicing the same.

One object of my invention is to hold the teat cups in place during the milking operation without a belt or surcingle, at the same time relieving the vacuum below that necessary to draw milk from the teat so as to permit the teat to expand normally when the suction is relieved.

Another object of my invention is to provide durable and simple means capable of being mounted on a pail or other suitable container from which air is exhausted by power, for controlling the passages to the teat cups so as to perform the milking operation above outlined.

Another object is to so arrange the mechanism that the valve elements may be readily wiped off and cleaned at the end of the milking operation without disturbing the adjustment of other mechanical parts.

Further objects and advantages of my invention will become apparent as the description proceeds.

In the accompanying drawings Figure 1 is a side elevation of that portion of a milking apparatus commonly referred to as a pulsator illustrating the application of my invention thereto. Fig. 2 is an enlarged view of the pulsator and Fig. 3 a central section through the same. Fig. 4 is a detail horizontal section on the line 4—4 of Fig. 2. Fig. 5 is a detail of a modified construction. Fig. 6 is an assembly view showing the pail with one cluster of teat cups and Fig. 7 is an enlarged section of one of the teat cups.

In the embodiment of my invention selected for illustration a suitable cover 10 is equipped with a washer 12 and may rest on a pail 14 into which the milk is to be delivered. The air is exhausted from the entire pail by any suitable means through a tube 16. A bail 18 extending above the cover 10 is used for carrying the same from place to place and is equipped with hooks 20 upon which the clusters of teat cups 21 may be hung when not in use.

The cover 10 supports a central plug 22 having a centrally located bore 24 communicating with one or more laterally directed tubes 26 of which I have illustrated two, extending into suitable fittings, each fitting comprising a stop cock 28 and a terminal 30 to which the rubber tube leading from the teat cups may be connected. It will be apparent that as many clusters of teat cups as there are sets of fittings may be simultaneously connected to the pail and operated by the single valve mechanism shown, thus simultaneously milking as many cows as there are clusters.

The vertical plunger 32 reciprocates in the bore 24 and has enlargements 34 and 36 separated by a portion of smaller diameter. The enlargement 36 fits closely in the bore and operates as a valve element to control the flow of gas or liquid.

The means I have illustrated for reciprocating the plunger comprises a piston carried by the upper end of the plunger, said piston preferably comprising a head 38 formed integral with or integrally assembled on the upper end of the plunger and the usual flexible element 40 clamped on the face of the head 38 by a retaining plate 42 held in place by a suitable nut 44. Alined apertures in the head 38, element 40 and plate 42 define a hole 45 extending downwardly to the upper surface of a sleeve 46 freely rotatable on the upper portion of the plunger. The sleeve 46 has a hole 48 which will be carried into and out of register with the hole 45 upon slight rotation of the sleeve.

A passageway 50 (see Fig. 2) extends from the pail through the plug 22 and the metal shell 52 forming a cylinder for the piston, to the upper end of the cylinder where its communication with the upper end of the cylinder may be controlled by a suitable needle valve 54. As the casing is open to the atmosphere in front at 56 and at the side at 57 it will be apparent that with holes 45 and 48 in register, the pressure above the piston will be atmospheric, the cross sectional area of holes 45 and 48 being much greater than that of the passage controlled by the needle valve. The air being exhausted from the interior of the pail, the pressure on the lower end of the plunger will be much less than atmospheric so that the plunger will move downward to the end of its stroke. Similarly, it will be noted that with holes 45 and 48 moved out of register, the pressure above the piston will immediately fall to approximately that in the pail and atmospheric pressure below the piston, which has a much larger area than the area of the lower end of the plunger, will immediately raise the piston and plunger.

I have provided means for rotating the sleeve 46 at each end of the stroke to move the holes 45 and 48 into and out of register. The means illustrated comprises a pin 58 radially projecting from the lower end of the sleeve and carrying a small roller 60 at its outer end which projects through the slot 56 in the casing. A block 62 attached to the casing carries an inwardly projecting ledge or lip at 64 of such length that at the end of the stroke in either direction roller 60 will just pass beyond the end of the ledge. Referring to Fig. 2, it will be seen that a spring coiled around the pin 68 has an arm 70 inclined upwardly and to the right on the left side of the ledge and a similar spring coiled around pin 71 has an arm 72 extending from the upward right hand corner of the slot 56 downward and to the left. As the roller moves down from the position shown in Fig. 2 it will strike the beveled upward end of the ledge and pass downward on the right of it until it passes the end of the ledge when spring 72 will throw it over to the left. This will move holes 45 and 48 out of register so that the plunger will be raised again and on the up stroke the roller will pass to the left of the ledge pushing spring 70 to one side until it rises above the ledge when it will be thrown back into the position shown bringing holes 45 and 48 into register again for the next down stroke.

To secure proper registry of holes 45 and 48 it will be seen that the piston must not rotate. The means I have provided for preventing accidental rotation of the piston comprises a pin 74 threaded into a hole in the plunger and reciprocating in a slot 57 in the side of the casing 52. The stationary arm of the spring 72 is held in place by a small stop screw, and the stationary arm of spring 70 may be conveniently slipped into a rabbet or groove in the face of the block 62 before the block is fastened in place by means of screw 78. A suitable cover 80 may be placed over the casing 52 and associated parts, and held in place either by means of fastening screws or by resilient engagement of its side flanges 82 with the sides of the casing.

In the position shown in Fig. 3, tubes 26 are connected to the pail and the suction will therefore be delivered through such stop cocks 28 as are open to the clusters of teat cups, contracting them and extracting milk from the teats of the cows. As the plunger moves down, the lower enlargement 36 will cover the openings cutting them off from the pail and passing beyond them so as to uncover a small segment at the upper edge of each opening. When the lower enlargement is in this position, the upper enlargement has not quite entered the bore, leaving a small annular passageway through which atmospheric air may enter the bore and flow through the small segmental openings to relieve the suction on the teat cups. It will be obvious that the extent to which the suction is thus relieved may be varied to suit the requirements by properly proportioning the parts of the machine. I prefer to relieve the suction to a point considerably below that necessary to extract milk from the teat which can be done without releasing the cup so completely that it will fall off the teat. It is therefore possible to operate the machine without using a surcingle to hold the clusters in place and at the same time the teats of the cow are not continuously subjected to heavy suction throughout the milking process which injures the teats and impairs the health of the cow.

When the machine has been used it may readily be cleaned by lifting the entire casing 52 bodily off the plug 22. This leaves plug 22, bore 24, and tubes 26 exposed so that they can conveniently be rinsed out and plunger 32 may be drawn into its lowermost position and the end of it readily cleaned, sterilized and dried. The engagement of pin 74 with the bottom of slot 57 limits the movement of the plunger out of the casing and insures the removal of the plunger and casing together as a unit when the casing is lifted off the plug. To insure correct alinement of the casing 52 when it is replaced, I may provide a nipple 84 projecting slightly above the surface of the plug 22 and defining part of the passageway 50. It is thus necessary to rotate the casing into correct alinement with the plug before it can be shoved home. A flange 86 may also be made part of casing 52 and operates to insure correct alinement of the parts and provide ample bearing surface against plug 22.

In Fig. 5 holes 48 and 45 are shown extending radially into a central pocket 49, threaded to receive the locking element 51, which element is centrally apertured at 53 to establish communication with the end of the cylinder. Among other advantages this eliminates the hole in the flexible element 40 and the necessity of assembling parts 40 and 42 so as to aline the apertures in them with hole 45.

In Fig. 7 I have illustrated one form of teat cup which may be used to practice my improved method of milking. This teat cup comprises a rigid casing 88, preferably of metal, a resilient inflation 90 and a connector 92 preferably of transparent material so that the flow of milk from the teat cup may be observed. The thickness of the wall of the inflation decreases from bottom to top and the upper edge is doubled back at 94 outside the casing. The top is covered by a cap 96, the heavy flange 98 of the cap overlying the edge of the inflation and clamping the parts firmly together with an air-tight joint. A small hole 100 near the bottom of the casing permits a gradual flow of air into and out of the space between the casing and the inflation during the milking operation. When full line suction is first delivered to such a teat cup the upper portions of the inflation where the diameter is greatest and the thickness least will collapse first, closing the teat close up to the udder and trapping a quantity of milk. As air flows in through the aperture 100 the collapse of the inflation will proceed downward, squeezing the teat with a massaging action very similar to hand milking or the sucking action of a calf. When the suction is relieved the resilience of the teat itself and of the inflation will result in expansion of the inflation back toward the position shown in Fig. 7, expanding the teat and permitting an additional amount of milk to enter the same. This expansion may obviously occur without complete relief of the suction to atmospheric pressure.

While I have illustrated and described in detail the preferred embodiment of my invention, it should be clearly understood that the disclosure is merely for purposes of illustration and that many modifications and variations will naturally occur to those skilled in the art. I aim in the subjoined claims to cover all such legitimate variations and modifications.

I claim as my invention:

1. In a device of the class described, a reciprocatory valve plunger having a small end and a large end, means connecting the small end permanently to a predetermined vacuum, and means rendered effective by the movements of the plunger for intermittently establishing a vacuum to act on the large end of the plunger and destroying said vacuum.

2. In a device of the class described, a cylinder, a piston head in said cylinder, a valve stem movable with said piston head, the pressure on the opposite end of the valve stem being below atmospheric and approximately constant, and means for varying the pressure above the piston head between atmosphere and a vacuum substantially equal to the vacuum acting on the end of the stem.

3. In a device of the class described, a reciprocating valve plunger having a small end and a large end, means connecting the small end permanently to a predetermined vacuum, and movable means associated with said plunger for effecting the establishing of a vacuum to act on the large end of said plunger and destroying said vacuum.

4. In a device of the class described, a cylinder, a piston in said cylinder, a sleeve adjacent said piston, said sleeve and piston having apertures adapted to be moved into and out of alinement by slight rotation of said sleeve, and means for rotating said sleeve to bring said apertures into alinement at one end of the stroke of the piston and to bring them out of alinement at the other end of the stroke.

5. In a device of the class described, a guide, a roller mounted to travel past said guide on either side past the end thereof, and resilient means for throwing said roller from one side of the guide to the other each time it passes the end thereof.

6. In a device of the class described, a guide, a roller reciprocating beyond the ends of said guide in both directions, means for moving said roller from one side of the guide to the other each time it passes beyond the end thereof, and valve means associated with said roller and operated by shifting said roller from one side of the guide to the other to control the reciprocation of the roller.

7. In a device of the class described, a reciprocatory pressure operated plunger, a sleeve about said plunger, and pressure control valve means carried by said plunger and sleeve and operated by relative rotation between said plunger and said sleeve, and at either end of the stroke of the plunger so as to move the plunger on the next stroke.

8. In a device of the class described, a reciprocatory plunger, a sleeve on said plunger, valve means carried by said plunger and sleeve to control the flow of the fluid operating the plunger, a radially projecting roller carried by the sleeve, a stationary guide, said roller moving past the end of the stationary guide in both directions and engaging the guide during the stroke to hold the sleeve in a predetermined position, and resilient means exerting a tendency toward the end of the stroke to press the roller against the guide whereby as the roller passes the end of the guide in either direction it will be thrown over to the other side thereof.

9. In a device of the class described, a reciprocatory plunger, a sleeve on said plunger, valve means carried by said plunger and sleeve to control the flow of the fluid operating the plunger, a radially projecting roller carried by the sleeve, a stationary guide, said roller moving past the end of the stationary guide in both directions and engaging the guide during the stroke to hold the sleeve in a predetermined position, and resilient means exerting a tendency toward the end of the stroke to press the roller against the guide whereby as the roller passes the end of the guide it will be thrown over to the other side thereof.

10. In a device of the class described, a piston, a cylinder guiding said piston, means exerting a constant tendency to move said piston in one direction, and means rendered operable by the movement of said piston in that direction to automatically vary the pressure in said cylinder to intermittently overcome said first mentioned means.

11. In a device of the class described, a plug having a bore, lateral passageways opening into the bore, a plunger having a head sliding in the bore, a piston carried by the plunger, and a cylindrical casing mounted on the plug and operatively associated with the piston, said casing and piston being removable together as a unit from said plug.

12. In a device of the class described, a plug having a bore, and lateral passageways opening into said bore, means for maintaining a vacuum at one end of the bore, and means removably mounted on top of the plug for intermittently connecting and disconnecting the passageways in the bore, said means being operated by means of the vacuum existing at one end of the bore.

13. In a device of the class described, a reciprocatory plunger having a large end and a small end, means connecting the small end permanently to a predetermined vacuum, a cylinder casing guiding the large end, a constricted passageway for exhausting air from above the large end, and means for intermittently connecting the space above the large end to atmosphere through an aperture larger than the constricted passageway, to intermittently overcome the suction on the small end and reciprocate the plunger.

14. In a device of the class described, a reciprocatory plunger having a large end and a small end, means connecting the small end permanently to a predetermined vacuum, a cylinder casing guiding the large end, a constricted passageway for exhausting air from above the large end, means for intermittently connecting the space above the large end to atmosphere through an aperture larger than the constricted passageway to intermittently overcome the suction on the small end and reciprocate the plunger, and adjustable means for varying the effective area of said constricted passageway.

15. In a device of the class described, a guide member, an element capable of reciprocatory movement past both ends of said guide member and also mounted for lateral movement to position it on either side of said guide member, and resilient means on either side of said guide member adjacent opposite ends thereof tending to press said element against said guide member.

16. In a device of the class described, a guide member, an element mounted for movement along said guide member, and a spring normally lying against one end of said guide member and diverging therefrom at an angle to define a V-shaped space for receiving said element whereby said element will press said spring away from the guide and upon passing the end of the guide be thrown by the spring to the other side of the guide.

In testimony whereof, I have hereunto set my hand.

FRANK S. FROST.